United States Patent
Oberg et al.

(10) Patent No.: US 8,358,479 B1
(45) Date of Patent: *Jan. 22, 2013

(54) METHOD AND APPARATUS TO LIMIT DC-LEVEL IN CODED DATA

(75) Inventors: Mats Oberg, Cupertino, CA (US); Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,684

(22) Filed: Jan. 13, 2012

Related U.S. Application Data

(60) Continuation of application No. 12/022,131, filed on Jan. 29, 2008, now Pat. No. 8,098,447, which is a division of application No. 10/752,817, filed on Jan. 6, 2004, now Pat. No. 7,330,320.

(60) Provisional application No. 60/478,869, filed on Jun. 16, 2003, provisional application No. 60/485,216, filed on Jul. 7, 2003.

(51) Int. Cl.
*G11B 5/02* (2006.01)

(52) U.S. Cl. .......... 360/25; 360/29; 360/31; 360/39; 360/40; 360/53

(58) Field of Classification Search .......... None
See application file for complete search history.

(56) References Cited

U.S. PATENT DOCUMENTS

| | | | |
|---|---|---|---|
| 3,649,915 A | 3/1972 | Mildonian, Jr. | |
| 5,122,912 A | 6/1992 | Kanota et al. | |
| 5,757,294 A * | 5/1998 | Fisher et al. | 341/59 |
| 5,790,495 A | 8/1998 | Kimura et al. | |
| 5,898,394 A * | 4/1999 | Kobayashi et al. | 341/58 |
| 5,931,968 A | 8/1999 | Gray | |
| 5,978,162 A | 11/1999 | Behrens et al. | |
| 6,140,857 A | 10/2000 | Bazes | |
| 6,148,025 A | 11/2000 | Shirani et al. | |
| 6,173,019 B1 | 1/2001 | Hee et al. | |
| 6,177,890 B1 * | 1/2001 | Keirn et al. | 341/59 |
| 6,208,477 B1 | 3/2001 | Cloke et al. | |
| 6,211,716 B1 * | 4/2001 | Nguyen et al. | 327/307 |
| 6,219,192 B1 | 4/2001 | Gopalaswamy et al. | |
| 6,266,202 B1 | 7/2001 | Nguyen et al. | |
| 6,415,003 B1 | 7/2002 | Raghavan | |
| 6,512,644 B1 | 1/2003 | Hall et al. | |
| 6,557,136 B1 * | 4/2003 | Friedmann | 714/752 |
| 6,578,164 B1 | 6/2003 | Stokes et al. | |
| 6,661,356 B1 | 12/2003 | Oberg | |

(Continued)

OTHER PUBLICATIONS

Fair, et al., "Guided Scrambling: A New Line Coding Technique for High Bit Rate Fiber Optic Transmission Systems," IEEE Transaction on Communications, vol. 39, No. 2, Feb. 1991.

(Continued)

*Primary Examiner* — Dismery Mercedes

(57) ABSTRACT

In a perpendicular magnetic recording system, the data that is being written by the write channel is fed back into the read channel. The read channel processes the data and decides if the written sequence is likely to have very poor DC characteristics. If that is the case, the write channel changes a scrambler seed and rewrites the data using the new scrambler seed. The data may also be inspected for patterns that might cause large baseline wander before being written to disk, i.e., in the write channel. A data sequence may be repeatedly scrambled and encoded until an acceptable level of estimated DC-wander has been achieved. The data sequence may then be written to disk.

18 Claims, 6 Drawing Sheets

U.S. PATENT DOCUMENTS

| | | | |
|---|---|---|---|
| 6,731,228 B2 * | 5/2004 | Suh et al. | 341/58 |
| 6,738,935 B1 * | 5/2004 | Kimmitt | 714/701 |
| 6,762,895 B2 | 7/2004 | Osafune | |
| 6,792,566 B2 * | 9/2004 | Chen et al. | 714/739 |
| 6,862,701 B2 * | 3/2005 | Walker et al. | 714/715 |
| 6,917,314 B1 * | 7/2005 | Oberg | 341/58 |
| 7,006,016 B1 | 2/2006 | Feng | |
| 7,103,123 B2 | 9/2006 | Chang et al. | |
| 7,116,504 B1 | 10/2006 | Oberg | |
| 7,158,058 B1 * | 1/2007 | Yu | 341/58 |
| 7,228,480 B1 * | 6/2007 | McEwen et al. | 714/746 |
| 7,330,320 B1 | 2/2008 | Oberg et al. | |
| 7,583,456 B1 | 9/2009 | Oberg et al. | |
| 8,018,357 B1 * | 9/2011 | Tsai | 341/56 |
| 2003/0206604 A1 * | 11/2003 | Lai | 375/350 |
| 2004/0130816 A1 * | 7/2004 | Feyh | 360/46 |

OTHER PUBLICATIONS

Proakis, J.G., "Generation of PN Sequences," Digital Communications, $2^{nd}$ ed., McGraw Hill International, pp. 831-836, 1989.

\* cited by examiner

MODEL WITH HIGH PASS FILTER

EQUIVALENT MODEL WITH LOW PASS FILTER

METHOD AND APPARATUS TO LIMIT DC-LEVEL IN CODED DATA

CROSS-REFERENCE TO RELATED APPLICATIONS

This application is a continuation application of, and claims priority to, pending U.S. patent application No. 12/022,131, filed on Jan. 29, 2008, entitled "Method and Apparatus to Limit DC-Level in Coded Data", now issued as U.S. Pat. No. 8,098,447, which is a divisional application of U.S. patent application No. 10/752,817, filed on Jan. 6, 2004, entitled "Method and
Apparatus to Limit DC-Level in Coded Data", now issued as U.S. Pat No. 7,330,320, which claims priority from U.S. Provisional Patent Application No. 60/478,869, filed on Jun. 16, 2003, entitled "Method and Apparatus to Limit DC-Level in Coded Data", and U.S. Provisional Application No. 60/485,216, filed on Jul. 7, 2003, entitled "Scrambling to Reduce DC-Content in Encoded Data". The application herein claims the benefit of priority of all of the above listed patent applications and hereby incorporates by reference in their entirety the said patent applications.

BACKGROUND

Perpendicular magnetic recording (PMR) techniques may enable higher recording densities on magnetic storage media than conventional longitudinal magnetic recording techniques. PMR systems include heads that record bits perpendicular to the plane of the disk. PMR disks include a high permeability ("soft") magnetic underlayer between a perpendicularly magnetized thin film data storage layer and the substrate. An image of the magnetic head pole created by the head is produced in the magnetically soft underlayer. Consequently, the storage layer is effectively in the gap of the recording head, where the magnetic recording field is larger than the fringing field produced by a longitudinal magnetic recording (LMR) head. The larger recording field makes it possible to record using smaller grain sizes and smaller bit sizes than in LMR systems. In PMR, the channel response has a DC component. For a channel that is AC-coupled to the preamplifier and read channel, or that contains some other means for high-pass filtering the channel response, there may be DC-distortion. The DC-distortion may manifest itself as a data dependent baseline wander, which can severely affect the performance of a system that equalizes the channel response to a response target that is not DC-free. cl SUMMARY In an embodiment, a perpendicular magnetic recording (PMR) system may scramble an input data sequence with a first scramble seed and encode the scrambled data sequence with a modulation encoder (e.g., a run length limited (RLL) encoder). The system may then determine whether the scrambled and encoded data sequence includes one or more patterns associated with large baseline wander, using, e.g., the running digital sum (RDS) over the sequence or a low pass filter as a metric. If such a pattern is detected, the system may control the scrambler to re-scramble the data sequence with another scrambler seed, encode the re-scrambled sequence, and determine whether this scrambled and encoded sequence includes on or more patterns associated with large baseline wander. This process may be repeated until a scrambled and encoded sequence without such patterns is generated, or until all available scrambler seeds are exhausted, in which case, the scrambler seed with the least amount of baseline wander may be used. The best scrambled and decoded sequence may then be written to the magnetic recording medium.

In an alternative embodiment, a PMR system may scramble an input data sequence with a first scramble seed and encode the scrambled data sequence with a modulation encoder (e.g., a run length limited (RLL) encoder). A write signal may be generated and the encoded data sequence written to the magnetic recording medium. The write signal may also be fed back to a read channel in the system. The write signal may be passed through a filter to mimic the magnetic recording channel. The read channel may then determine if DC-wander in the write signal is too large to be accurately decoded, or otherwise fails to meet a predetermined criterion as described below. If so, the data sequence may be scrambled with another scramble seed, encoded, and used to over-write the first encoded data sequence in the magnetic recording medium. This process may be repeated until an encoded data sequence that can be accurately decoded by the read channel is generated.

For both of the alternative embodiments described above, the data sequence may not be scrambled in the first run through the system.

DETAILED DESCRIPTION

Figure 1:
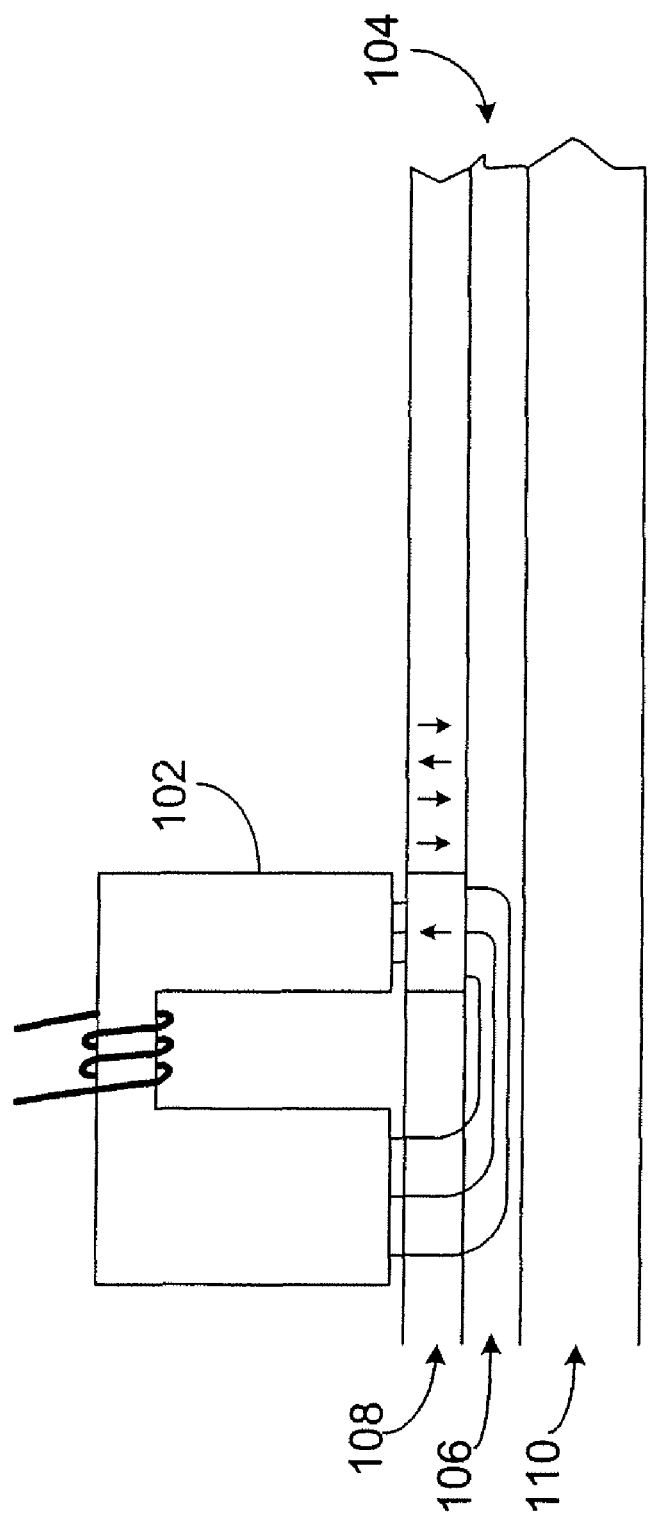
FIG. 1 is a block diagram of a read/write head and media in a perpendicular magnetic recording (PMR) system.

FIG. 1 shows a read/write head 102 and magnetic storage disk 104 in a perpendicular magnetic recording (PMR) system. The head records bits perpendicular to the plane of the disk. PMR disks include a high permeability ("soft") magnetic underlayer 106 between a perpendicularly magnetized thin film data storage layer 108 and the substrate 110. An image of the magnetic head pole created by the head 102 is produced in the magnetically soft underlayer 106. Consequently, the storage layer 108 is effectively in the gap of the recording head, where the magnetic recording field is larger than the fringing field produced by a longitudinal magnetic recording (LMR) head.

In PMR, the channel response has a DC component. For a channel that is AC-coupled to the preamplifier and read channel, or that contains some other means for high-pass filtering the channel response, there may be DC-distortion. The DC-distortion may manifest itself as a data dependent baseline wander, which can severely affect the performance of a system that equalizes the channel response to a response target that is not DC-free.

Figure 2:
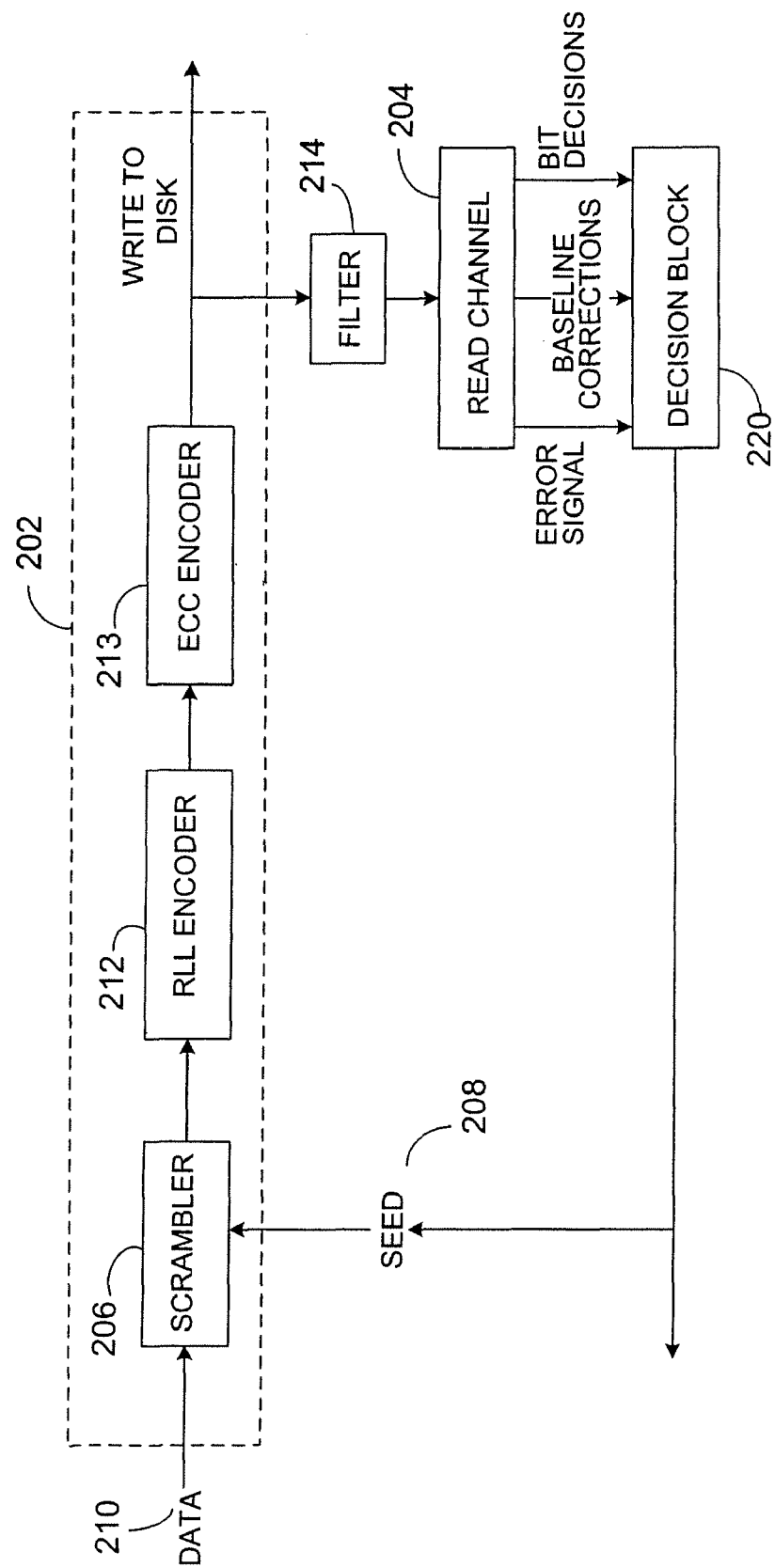
FIG. 2 is a block diagram of a write channel and a read channel in the PMR system.

FIG. 2 shows a write channel 202 and a read channel 204 for the PMR system. In an embodiment, the data that is being written by the write channel 202 is fed back into the read channel 204. The read channel processes the data and decides if the written sequence is likely to have very poor DC characteristics. If that is the case, the write channel changes a scrambler seed and rewrites the data using the new scrambler seed.

Figure 3:
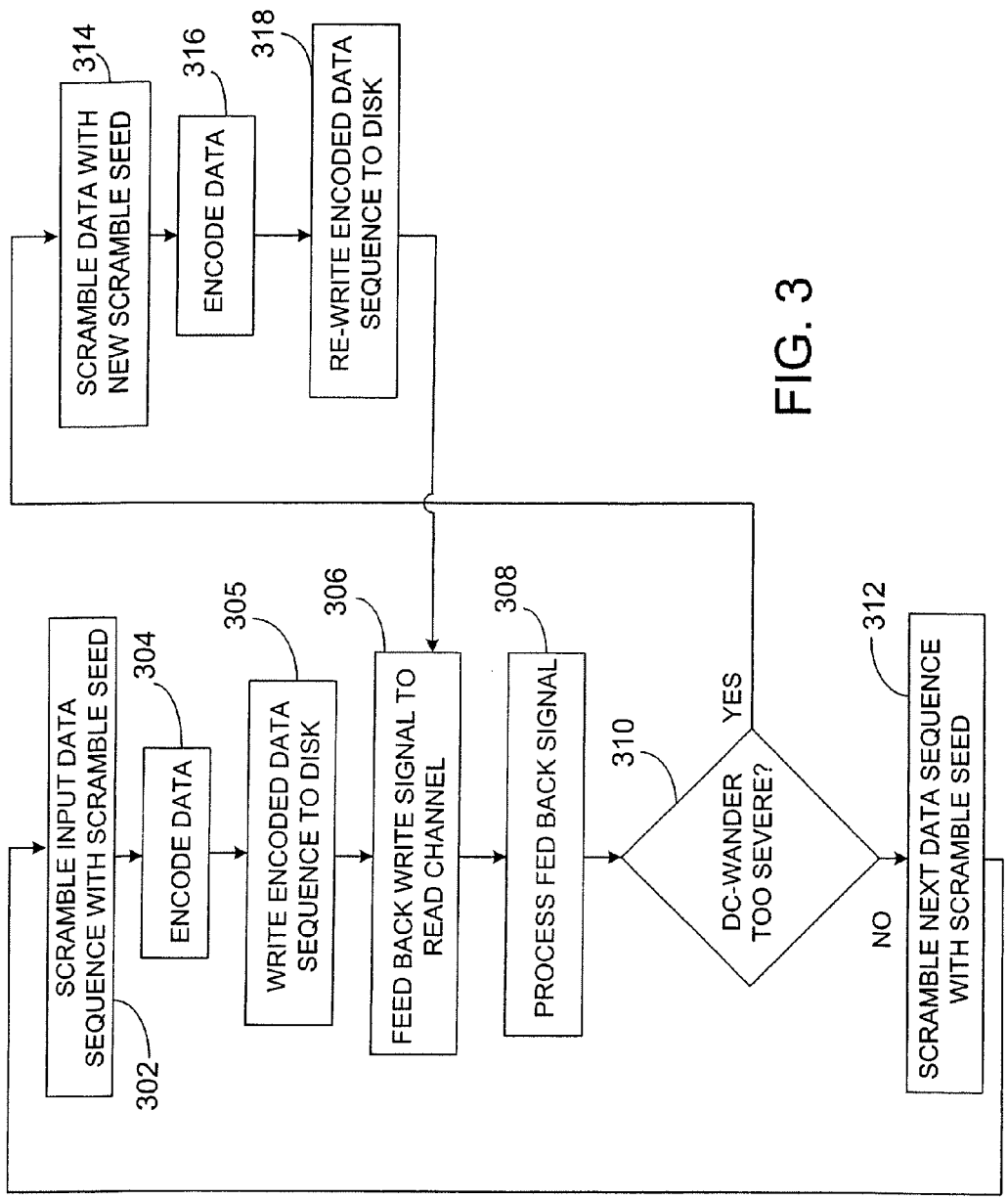
FIG. 3 is a flowchart describing a DC-wander correction technique according to an embodiment.

FIG. 3 is a flowchart describing a DC-wander correction technique according to an embodiment. A scrambler module 206 may use a scrambler seed 208 to scramble the data 210 input to the write channel 202 (block 302). The data may be scrambled before it is encoded by the modulation encoder, e.g., a run length limited (RLL) encoder 212 (block 304). Alternatively, the scrambling may be performed after modulation encoding if the scrambler used does not destroy the constraints imposed by the modulation encoder (for example, if only bits that are left uncoded by the modulation encoder are scrambled and those bits do not affect how the encoded bits were encoded).

A number of different scramblers may be used. For example, in an embodiment, a pseudo-noise (PN) sequence generated using a maximum-length shift register may be added modulo-2 to each data bit to be scrambled. Regardless of the type of scrambler used, the detector must know if and how the data was scrambled to properly descramble the data. In an embodiment, the detector may know how the data is scrambled, but may not necessarily know the initial conditions or the scrambler seed that was used to scramble the data. This information (e.g., the scrambler seed or method) may be embedded in the data that is written. Alternatively, the detector may descramble the data by trial and error. For example, the detector may descramble the data following a predetermined list of scramblers/scrambler seeds until the descrambled data decodes properly by some error-control code (ECC) 213, cyclic redundancy check (CRC) code, or some other check. In an embodiment, the scrambling is done prior to ECC encoding in the write channel, and descrambling is done after ECC decoding at the detector.

The write signal generated by the write channel is written to the disk (block 305). The write signal is also fed back into the read channel 204 (block 306), possibly via a filter 214 to mimic the magnetic channel. The read channel 204 processes the signal (block 308), and a decision block 220 determines if the DC-wander is too severe to be handled in the read channel (block 310). If the DC-wander is determined to be within acceptable limits at block 310, then the next data sequence in the input data stream is scrambled (block 312) and encoded. However, if the DC-wander is determined to be too severe, the read channel requests that the sector be rewritten with another scrambler seed (block 314). The newly scrambled data sequence is then encoded (block 316) and re-written to the disk (block 318), over-writing the "bad" sequence.

In an embodiment, all of the functions in the read channel 204 that would be expected to be active in the actual reading of a waveform from the disk are active. An error signal generated internally in the read channel may be used to monitor how severe the DC-wander is at the detector input (at block 310). If the DC-wander is determined to be too large, a re-write request may be asserted by the read channel. In other embodiments, various functions of the read channel may be disabled. For example, in an embodiment, the bit detector may be disabled, since the bits can be obtained directly from the write channel.

Several parameters may be used by the decision block 220 to determine whether the DC-wander is too large. The following are exemplary parameters for determining excessive DC-wander:

(a) Simple threshold: the decision block 220 considers the DC-wander to be too large if the absolute value of the error signal is larger than a given threshold at any point in the data sequence;

(b) The decision block 220 considers the DC-wander to be too large if the absolute value of the error signal is larger than a given threshold for a total of at least a given number of clock cycles;

(c) The decision block 220 considers the DC-wander to be too large if the absolute value of the error signal exceeds the given threshold for at least a given number of consecutive clock cycles. For example, in an embodiment, the threshold is 3 and the given number of consecutive cycles is three. The error sequence $|e|=\{0, 1, 4, 5, 1, 6, 3, 4, 6, 7, 2, 3, 7\}$ has seven numbers greater than 3. However, only the three consecutive occurrences of numbers greater than 3 (i.e., the sub-sequence $\{4, 6, 7\}$) are counted.

The parameters described above may be used separately or combined. For example, the "simple threshold" (a) and "consecutive clock cycle" (c) parameters can be combined. Then the threshold for (a) should be larger than the threshold for (c).

In an embodiment, an encoded data sequence may be inspected for patterns that might cause large baseline wander before being written to disk, i.e., in the write channel. The data sequence may be repeatedly scrambled and encoded until an acceptable level of estimated DC-wander has been achieved. The data sequence may then be written to disk.

Figure 4:
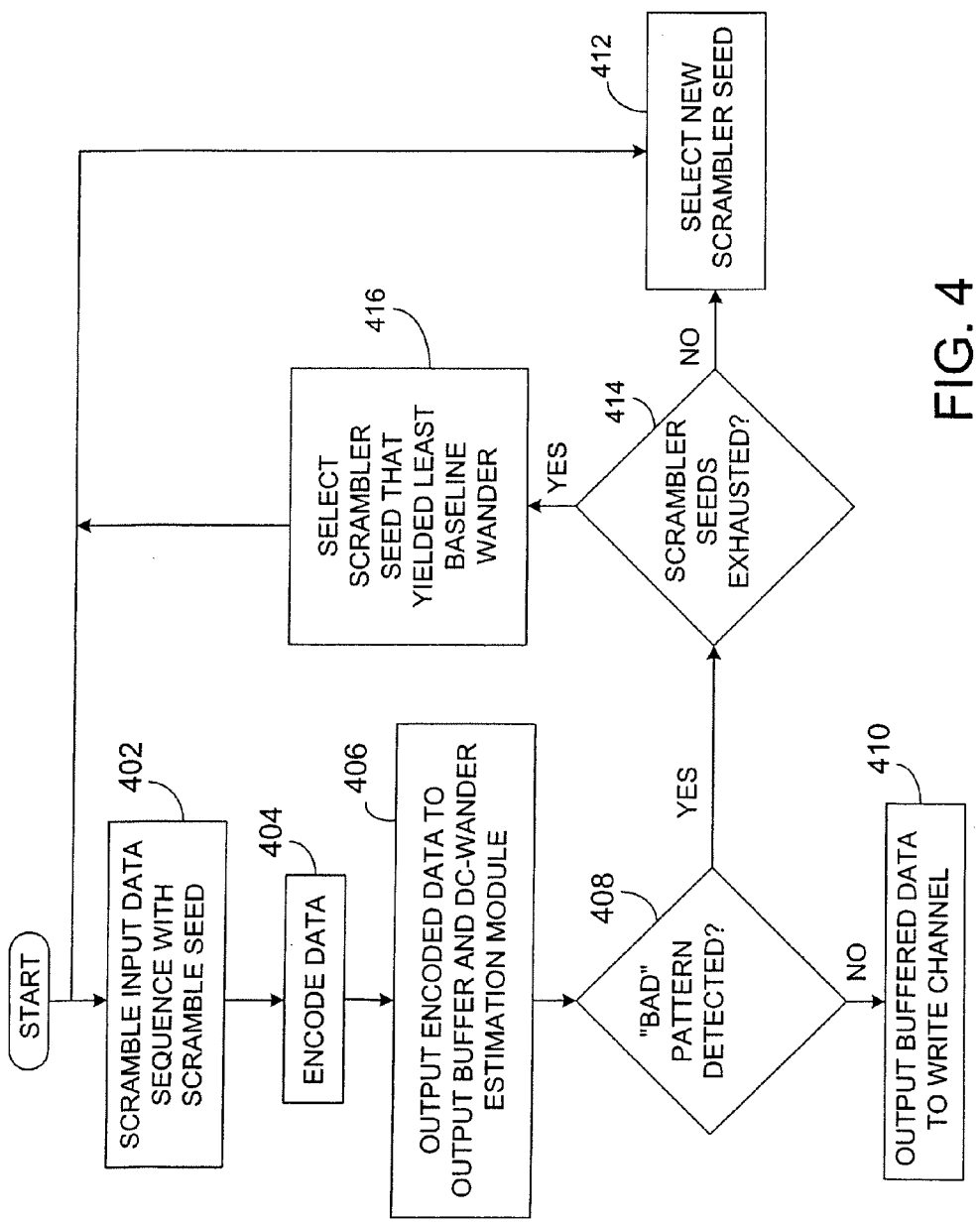
FIG. 4 is a flowchart describing a DC-wander correction technique according to another embodiment.
Figure 5:
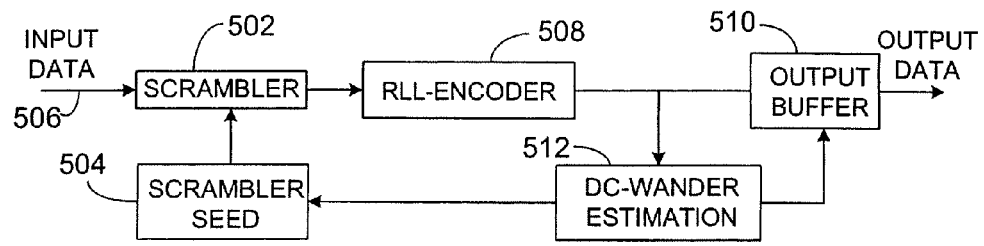
FIG. 5 is a block diagram of an encoding portion of a write channel in a PMR system.

FIG. 4 is a flowchart describing a DC-wander correction technique according to an embodiment. As shown in FIG. 5, a scrambler module 502 may use a scrambler seed 504 to scramble data sequences in an input data stream 506 (block 402). Information about the scrambler (e.g., the scrambler seed or method) may be embedded in the data so that the data can be readily decoded by the detector. The scrambled data may then be encoded by an RLL encoder 508 (block 404).

After the RLL encoder, the encoded data may be output to an output buffer 510 and a DC-wander estimation module 512 (block 406). The DC-wander estimation module may screen for patterns that might cause large baseline wander (i.e., "bad" patterns) (block 408). If no such pattern is found, the output buffer may output the encoded data to the write channel for further processing and writing to the disk (block 410). Otherwise, the data is scrambled using another scrambler seed (block 412) and then encoded by the RLL encoder 508 (block 404). The newly encoded data sequence is then screened for patterns that may cause large baseline wander (block 408). This process may continue until the encoded data sequence is determined to contain no bad patterns. The encoded data is then output to the write channel. In the case that all scrambler seeds are exhausted (block 414), the data may be scrambled using the scrambler seed that yielded the least baseline wander (block 416).

Several metrics may be used by the DC-wander estimation module 512 to measure baseline wander. In an embodiment, the maximum absolute value of the running digital sum ($RDS^{max}$) over the entire sequence may be used.

The running digital sum of a binary sequence $x=\{x_0, x_1, \ldots\}$, where $x_i = \pm 1$ is defined as $$RDS(n) = \sum_{i=0}^{n} x_i \qquad (1)$$

The maximum absolute value of RDS over a sequence of length N is $$RDS^{max} = \max_{0 \le n \le N-1} |RDS(n)|. \qquad (2)$$

A first method to determine if a sequence has large baseline wander uses equation (2) for the entire sequence. If $RDS^{max}$ is above a certain threshold, the sequence is considered to have a large baseline wander. In the case that all available sequences have a large baseline wander, the sequence with the smallest $RDS^{max}$ may be selected.

A second method splits the sequence into two or more subsequences, and uses the first method for each sub-sequence. In the case that all available sequences have one or more sub-sequences with large baseline wander, the sequence with the smallest number of sub-sequences with large baseline wander may be selected. A tie among those can, for example, be broken by selecting the sequence with the smallest $RDS^{max}$.

For a third method, the number of bit periods for which the absolute value of the RDS is greater than a threshold is counted.

$$RDS^{count} = \sum_{i=0}^{N-1} I_i, \qquad (3)$$

where $I_i$ is an indicator function $$I_i = \begin{cases} 1 & \text{if } |RDS(i)| > t_h \\ 0 & \text{if } |RDS(i)| \le t_h \end{cases} \qquad (4)$$

If $RDD^{count}$ is greater than a certain value, the sequence is determined to have a large baseline wander. If all available sequences have large baseline wander, then the sequence with the smallest $RDD^{count}$ is selected.

A fourth method is similar to the third method, but only the first instance when several consecutive values of the RDS is greater than a threshold is counted.

$$RDS^{nbr} = \sum_{i=0}^{N-1} I_i^b, \qquad (5)$$

where $$I_i^b = \begin{cases} 1 & \text{if } |RDS(i)| > t_h \text{ and } |RDS(i)| \le t_h \\ 0 & \text{otherwise} \end{cases} \qquad (6)$$

For example, if the RDS for a sequence of length 20 is given by $\{1,0,-1,-2,-3,-4,-5,-4,-3,-4,-3,-2,-1,1,2,1,2,3,$ $2\}$, and the threshold $t_h=3$. Then $RDD^{count}=4$ using equation (3), and $RDS^{nbr}=2$ using equation (5).

In a fifth method, the mean of the absolute value of the RDS is used.

$$RDS^{mean} = \frac{1}{N} \sum_{i=0}^{N-1} |RDS(i)|. \qquad (7)$$

If $RDS^{mean}$ is greater than a threshold, the baseline wander may be considered to be large.

Figure 6A:
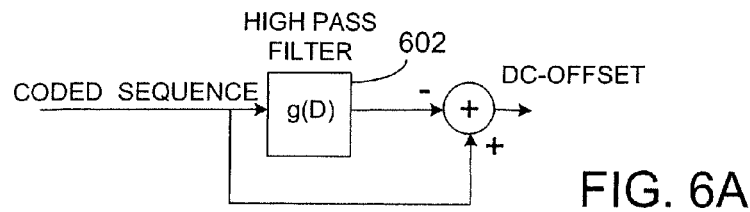
FIG. 6A is a block diagram of a system modeling DC-offset due to high pass filters.
Figure 6B:
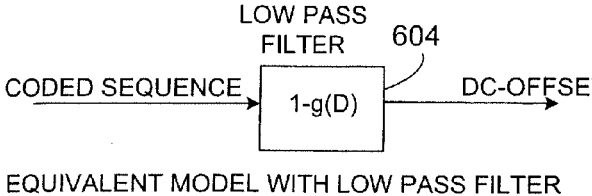
FIG. 6B is a block diagram of an equivalent system modeling DC-offset due to high pass filters using a low pass filter.

In an alternative embodiment, a low pass filtered version of the sequence is used as a metric rather than the RDS of the sequence. The main source of baseline wander in many systems is AC coupling or other high pass filtering circuits. The amount of baseline wander caused by a code sequence can be estimated by passing the sequence through a model of the high pass filter 602 (which mimics AC-coupling), and subtracting the output of the filter from the input sequence, as shown in FIG. 6A. Equivalently, the amount of baseline wander caused by a code sequence can be estimated by passing the code sequence through a low pass filter 604 with a transfer function that complements the high pass filter, as shown in FIG. 6B. For example, if the high pass filter model has the transfer function H(z), then the low pass filter should have the transfer function F(z)=1- H(z).

Figure 7:
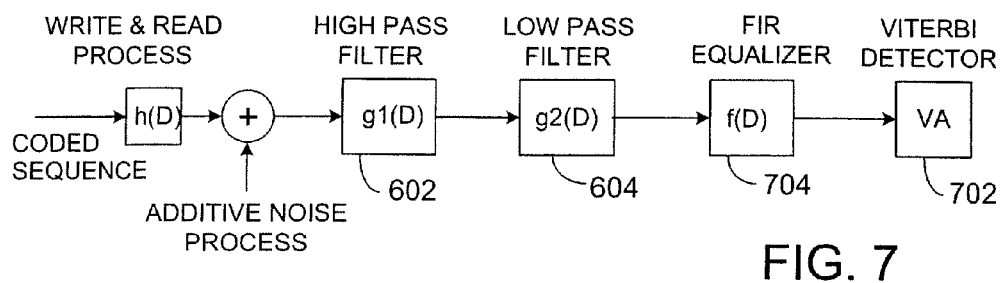
FIG. 7 is a block diagram of a discrete time model of a magnetic recording system.
Figure 8:
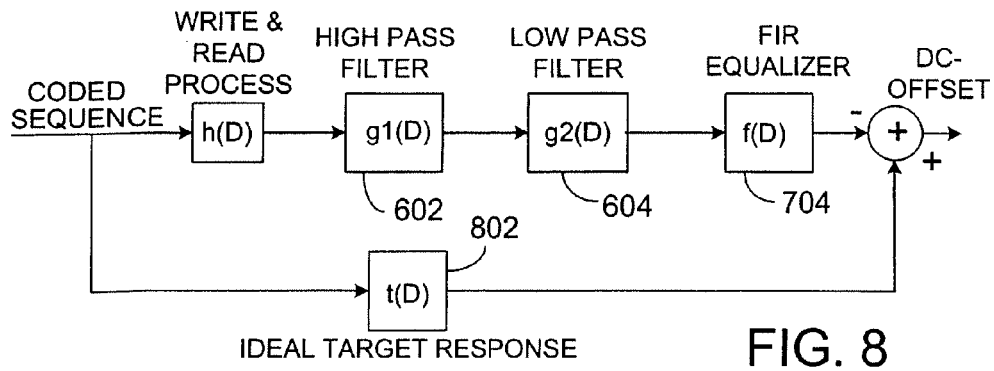
FIG. 8 s a block diagram of a discrete time model of DC-offset in a magnetic recording system.
Figure 9:
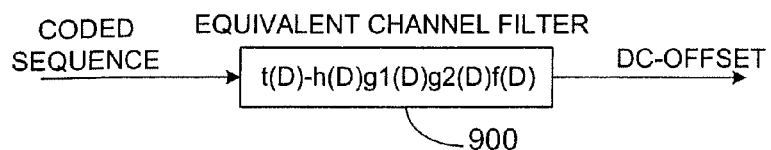
FIG. 9 is block diagram of a simplified model of DC-offset in a magnetic recording system.

Other, usually more complex, filters can be designed to mimic not only the impact of high pass filters, but also the impact of the write and read process and the signal shaping in the read channel. FIG. 7 shows a simple block diagram of a discrete time model of a magnetic recording channel. This model may be used as a basis for the DC-offset model shown in FIG. 8. Since the correct bit decisions are know, they may be used instead of a Viterbi detector 702. The DC-offset may be estimated by passing the encoded sequence through an ideal target response 802 and then subtracting the finite impulse response (FIR) equalizer output 704 from the target response output. This model can be simplified as shown in FIG. 9, where the filter 900 is given by H(D)=t(D)−h(D)g1 (D)g2(D)f(D).

Although several examples have been given, any filter that generates an estimate of the DC-offset based on the encoded data sequence as input can be used for this purpose.

The following are exemplary parameters that may be used to determine if a sequence has a large DC-wander in systems using low pass filtered sequences as a metric:

If the largest DC-offset of the sequence is larger than a threshold; If the largest DC-offsets of the sub-sequences are larger than a threshold;

If the DC-offset is larger than a threshold for more than another threshold number of bit-cycles;

If the DC-offset is larger than a threshold for more than another threshold number of times;

If the mean of the absolute value of the DC-offset is greater than a threshold.

Figure 10:
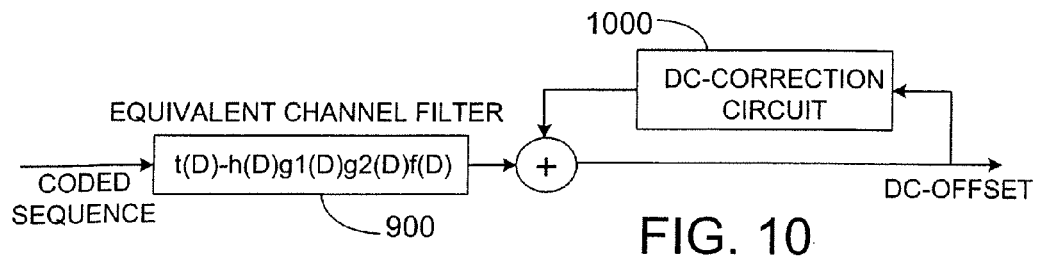
FIG. 10 is block diagram of a simplified model of DC-offset in a magnetic recording system using an adaptive DC-correction circuit.
Figure 11:
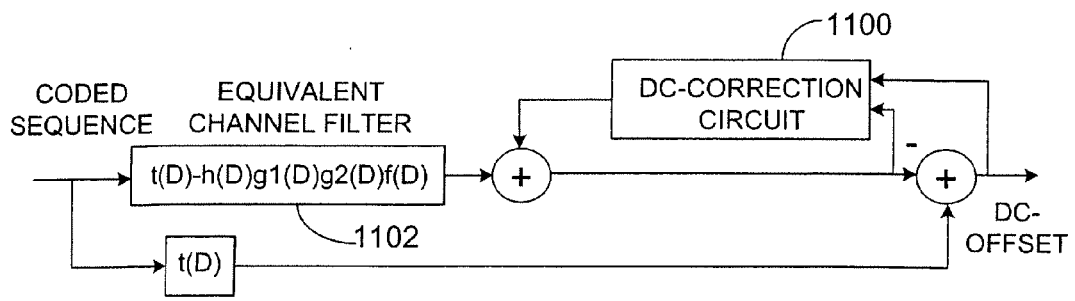
FIG. 11 is a block diagram of another simplified model of DC-offset in a magnetic recording system using an adaptive DC-correction circuit.

In another embodiment, a low pass filtered sequence with DC correction is used as a metric. Instead of just estimating the DC-offset based on filtering the encoded sequence, this method assumes that there is a DC-correction circuit built into the system. Different types of DC-correction circuits can be used. In FIG. 10, a block diagram of the filter is shown with an adaptive DC-correction circuit 1000. In most cases, the DC-correction circuit can be modeled as a low pass filter 900. Another block diagram of the DC-offset estimation filter with DC-correction circuit 1100 is shown in FIG. 11. Here, the DC-correction circuit uses the DC-corrected channel estimation filter output 1102 as its input.

In an alternative embodiment, several seeds may be used to scramble the encoded sequence in parallel. The scrambled sequences may then be encoded and evaluated in parallel. The seed that provides the best response may then be selected.

In other alternative embodiments, the first trial may not be scrambled. For example, block 302 and 402 in FIGS. 3 and 4, respectively, may be skipped when the sequence is first input to the write channel.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

What is claimed is:

1. A method comprising:
   encoding a data sequence with a modulation encoder to form an encoded data sequence;
   generating a write signal for writing the encoded data sequence;
   reading the write signal;
   determining whether DC-wander in the write signal meets a predetermined criterion; and
   scrambling the encoded data sequence if the DC-wander in the write signal does not meet the predetermined criterion.

2. The method of claim 1, wherein the encoded data sequence is a first encoded data sequence, the write signal is a first write signal, and the method further comprises:
   encoding the scrambled first encoded data sequence to form a second encoded data sequence; and
   generating a second write signal for writing the second encoded data sequence.

3. The method of claim 2, further comprising:
   writing the scrambled first encoded data sequence to a magnetic recording medium; and
   over-writing the scrambled first encoded data sequence with the second encoded data sequence if the DC-wander in the first write signal does not meet the predetermined criterion.

4. The method of claim 1, further comprising:
   prior to encoding the data sequence to form the encoded data sequence, scrambling the data sequence with a scrambler pattern different from that used when the DC-wander in the write signal does not meet the predetermined criterion.

5. The method of claim 1, wherein the encoded data sequence is a first encoded data sequence, the write signal is a first write signal, and the method further comprises:
   encoding the scrambled first encoded data sequence to form a second encoded data sequence;
   generating a second write signal for writing the second encoded data sequence;
   writing the second encoded data sequence to a magnetic recording medium;
   reading the second write signal;
   determining whether DC-wander in the second write signal meets a predetermined level; and
   re-scrambling the scrambled data sequence if the DC-wander in the second write signal does not meet the predetermined level.

6. The method of claim 5, wherein re-scrambling the scrambled data sequence is performed using a scrambler pattern different from that used to scramble the first encoded data sequence.

7. The method of claim 1, wherein scrambling the encoded data sequence includes scrambling the encoded data sequence a plurality of times, each with a different scrambler pattern, until the DC-wander meets the predetermined criterion.

8. A device comprising:
   a scrambler module configured to scramble a data sequence in an input data stream;
   an encoder configured to encode the scrambled data sequence;
   a decision module configured to identify a level of DC-wander associated with the encoded scrambled data sequence; and
   a buffer to output the encoded scrambled data sequence to be written onto one or more sectors of a medium;
   wherein:
   the decision module is configured to determine whether the level of the DC-wander meets a predetermined criterion; and
   the scrambler module is configured to re-scramble the scrambled data sequence responsive to the decision module determining that the level of the DC-wander does not meet a predetermined criterion.

9. The device of claim 8, wherein:
   the encoder is configured to re-encode the re-scrambled data sequence to generate a newly encoded data sequence.

10. The device of claim 9, wherein:
    the decision module is configured to determine whether a level of DC-wander associated with the newly encoded data sequence meets the predetermined criterion; and
    the buffer is configured to output the newly encoded data sequence to be written onto the one or more sectors of the medium responsive to the level of the DC-wander associated with the newly encoded data sequence meets the predetermined criterion.

11. The device of claim 8, wherein the scrambler module is configured to re-scramble the scrambled data sequence using a scrambler pattern different from that used to scramble the data sequence in the input data stream.

12. The device of claim 8, wherein the scrambler module is configured to re-scramble the scrambled data sequence a plurality of times, each with a different scrambler pattern, until the level of the DC-wander of the scrambled data sequence meets the predetermined criterion.

13. The device of claim 12, wherein the scrambler module is configured to re-scramble the scrambled data sequence each time with a scrambler pattern that yields a lesser DC wander than a previous scrambler pattern.

14. The device of claim 8, wherein the decision module identifies the level of the DC-wander using a running digital sum associated with the encoded scrambled data sequence.

15. The device of claim 8, wherein the decision module identifies the level of the DC-wander using a filtered version of the encoded scrambled data sequence.

16. The device of claim 15, wherein:
    the decision module includes a high pass filter, passes the encoded scrambled data sequence to the high pass filter to generate a filtered output, and subtracts the filtered output from the encoded scrambled data sequence to generate a DC offset; and
    the filtered version of the encoded scrambled data sequence is determined based on the DC offset.

17. The device of claim 15, wherein:
the decision module includes a low pass filter, passes the encoded scrambled data sequence to the low pass filter to generate a DC offset; and
the filtered version of the encoded scrambled data sequence is determined based on the DC offset.

18. A system comprising:
a write channel configured to receive a data sequence and encode the data sequence; and
a read channel configured to:
receive the encoded data sequence;
determine whether the encoded data sequence contains DC distortion and whether the DC distortion meets a predetermined threshold; and
initiate writing of the encoded data sequence to a magnetic recording medium when the DC distortion meets a predetermined criterion;
wherein:
the write channel is configured to:
scramble the encoded data sequence; and
re-scramble the encoded scrambled data sequence to generate a new scrambled data sequence when the DC distortion does not meet the predetermined threshold; and
the read channel is configured to write the new scrambled data sequence to the magnetic recording medium when DC distortion contained in the new scrambled data sequence meets the predetermined criterion.

* * * * *